US006868527B2

(12) United States Patent
Marler et al.

(10) Patent No.: US 6,868,527 B2
(45) Date of Patent: *Mar. 15, 2005

(54) CONTROLLING PROCESSOR-BASED SYSTEMS

(75) Inventors: Jerilyn L. Marler, Beaverton, OR (US); Mary J. LaLomia, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 346 days.

(21) Appl. No.: 09/273,385

(22) Filed: Mar. 22, 1999

(65) Prior Publication Data

US 2002/0089548 A1 Jul. 11, 2002

(51) Int. Cl.$^7$ .................................................. G06F 3/14
(52) U.S. Cl. ...................................... 715/817; 715/823
(58) Field of Search ................................. 345/348, 349, 345/356, 357, 352, 353, 354, 389, 329, 327, 328, 145, 146; 715/810–820, 802–805, 748, 811, 730–732, 814–825; 709/230, 204

(56) References Cited

U.S. PATENT DOCUMENTS

| | | | | |
|---|---|---|---|---|
| 5,542,039 A | * | 7/1996 | Brinson et al. | 345/805 |
| 5,687,331 A | * | 11/1997 | Volk et al. | 715/840 |
| 5,990,890 A | * | 11/1999 | Etheredge | 345/347 |
| 6,018,372 A | * | 1/2000 | Etheredge | 348/569 |
| 6,034,689 A | * | 3/2000 | White et al. | 345/357 |
| 6,172,674 B1 | * | 1/2001 | Etheredge | 345/327 |
| 6,208,335 B1 | * | 3/2001 | Gordon et al. | 345/327 |
| 6,243,085 B1 | * | 6/2001 | Roach | 345/302 |
| 6,724,405 B2 | * | 4/2004 | Matthews et al. | 715/773 |
| 6,728,967 B2 | * | 4/2004 | Bennington et al. | 725/43 |
| 6,769,128 B1 | * | 7/2004 | Knee et al. | 725/43 |
| 6,771,317 B2 | * | 8/2004 | Ellis et al. | 348/569 |

* cited by examiner

Primary Examiner—Steven Sax
(74) Attorney, Agent, or Firm—Trop, Pruner & Hu, P.C.

(57) ABSTRACT

A system enables a user to select one of a plurality of user selectable options in a processor-based system. In one embodiment of the present invention, the selections may be made using a wireless remote control unit. Each of a plurality of graphical user interfaces may be selectively, sequentially indicated or highlighted for a period of time sufficient to enable the user to input an indication that the user wishes to select the indicated graphical user interface. When the user makes an input during the period when a particular option is highlighted, that option is automatically selected.

20 Claims, 4 Drawing Sheets

CONTROLLING PROCESSOR-BASED SYSTEMS

BACKGROUND

This invention relates generally to controlling processor-based systems.

Processor-based systems are being used in a number of applications, including desktop and laptop computers and personal digital assistants. In addition, processor-based systems are used to control a number of appliances. For example, a computer system called a set-top computer system may be operated in conjunction with a television receiver. The set-top computer system may provide both computer functionalities, together with advanced television functionalities. The set-top computer system may be controlled by a remote control unit (RCU).

Conventional RCUs may be infrared based. Conventionally, appliance infrared controls use unidirectional legacy infrared controls. When the user operates the remote control, an infrared beam is transmitted to the appliance, which decodes the infrared signal, determines the nature of the command, and implements appropriate action.

Conventionally, computer systems may be controlled by keyboards and mouses. While this may be possible with the set-top computer systems, it may be advantageous to enable the user to operate the set-top computer system like a television. Thus, users may prefer to use RCUs to control not only their television viewing, but the set-top computer system, as well.

Thus, there is a continuing need for better ways to enable users to input preferences to processor-based systems.

SUMMARY

In accordance with one embodiment of the present invention, a method of controlling a processor-based system includes sequentially indicating a plurality of selectable options. If an input signal is received when a first option is indicated, the first option is selected.

DETAILED DESCRIPTION

Figure 1:
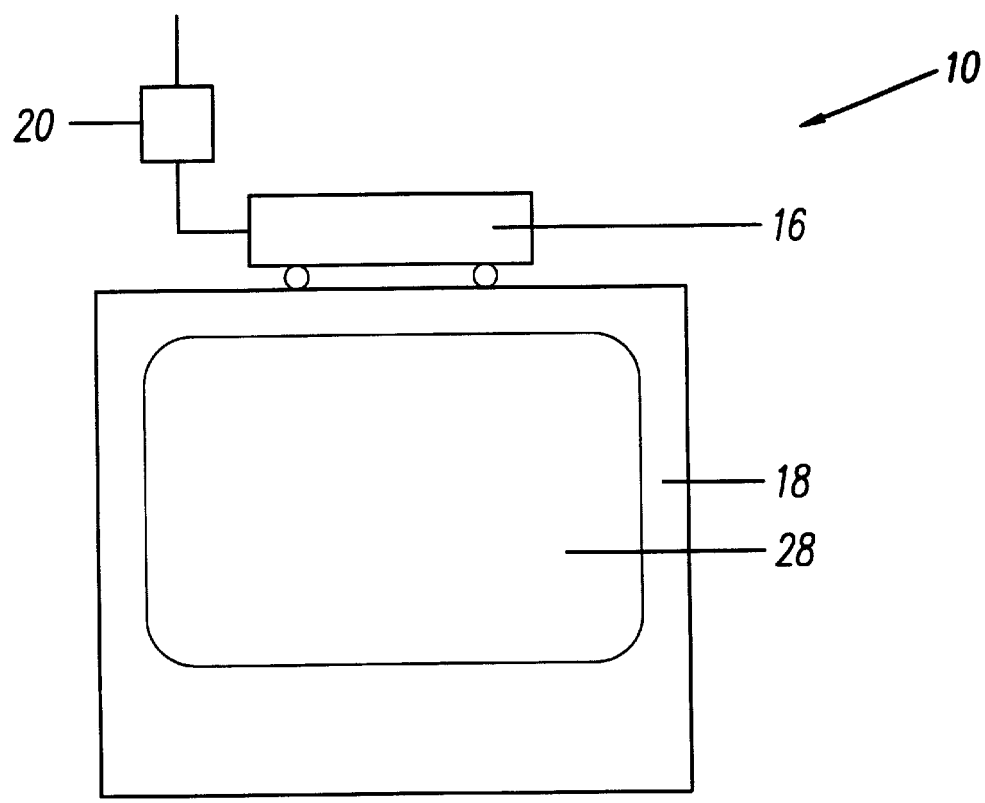
FIG. 1 is a schematic depiction of one embodiment in accordance with the invention.
Figure 1:
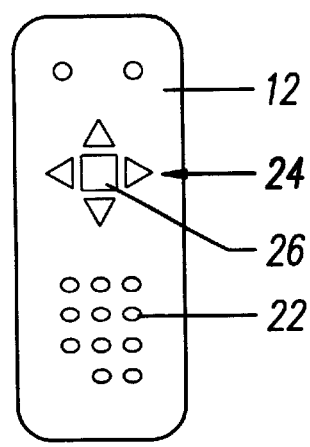

A system 10, shown in FIG. 1, may include a remote control unit (RCU) 12, which may control a processor-based system 16, such as a set-top computer system coupled to a television receiver 18 having a display 28. The RCU 12 may be automatically programmed to operate the processor-based system 16, using, for example, an infrared communications link. Of course, other wired and wireless communication links may be used as well, including a radio frequency communication link, such as the Bluetooth radio frequency link which is described on the Internet at www.bluetooth.com.

In one embodiment of the invention, the RCU 12 may send a unidirectional legacy infrared signal, which is detected by a detector on the processor-based system 16. Bi-directional infrared signals (e.g., signals possible through the use of Infrared Data Association Control (IrDA-C) protocol) may also be used.

The RCU 12 may include numerical keys 22, which may, for example, enable the user to input channel selections. It may also include a navigation keypad 24, with a select button 26, to input user selections. In some embodiments, the navigation keypad 24 may not be available.

The processor-based system 16 may be coupled to a network 20. The network may be a computer network or telephone network that enables connections to other computers, e.g., an Internet connection.

Figure 2:
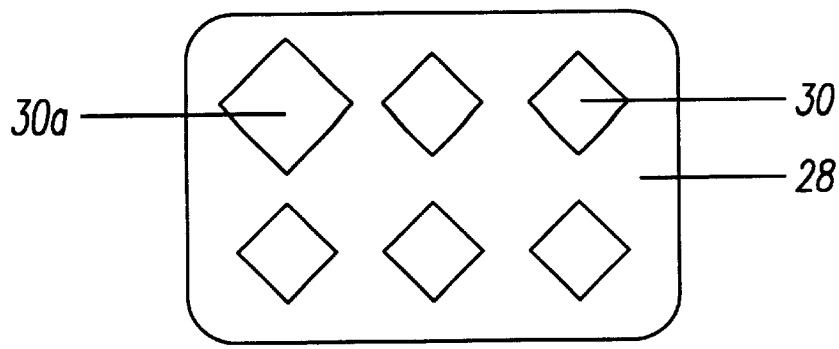
FIG. 2 is a depiction of an exemplary screen display in accordance with the embodiment shown in FIG. 1 in one embodiment of the present invention.

Referring to FIG. 2, in a selection mode, the display screen 28 may display a plurality of user selectable options, illustrated as diamond shaped graphical user interfaces 30 in one embodiment of the invention. In the embodiment illustrated in FIG. 1, the graphical user interface 30a is highlighted by enlarging that interface. Other forms of highlighting may include brightening the icon 30, changing its color, or providing additional graphical user interfaces, proximate to the interface 30. In any case, one of the graphical user interfaces 30 may be indicated, for example, by highlighting that graphical user interface.

Figure 3:
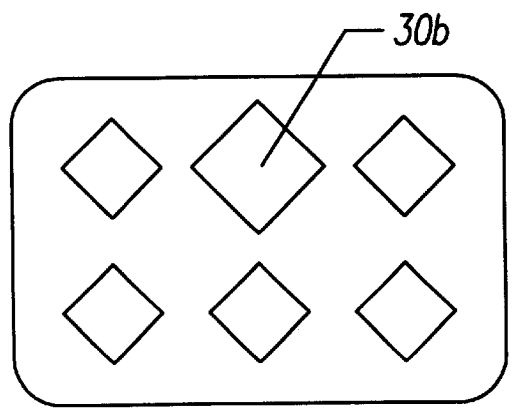
FIG. 3 is a depiction of the screen display at a different time.
Figure 4:
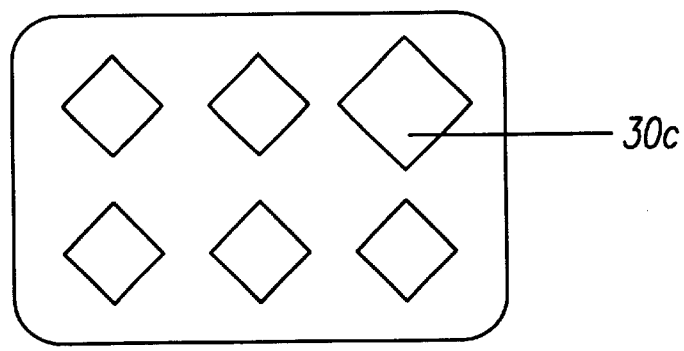
FIG. 4 is a depiction of the screen display at a different time.

Referring to FIGS. 3 and 4, additional graphical user interfaces 30b and 30c may be highlighted at other instances of time. In one embodiment of the present invention, it is advantageous to sequentially select, indicate, or highlight each of the potentially selectable graphical user interfaces 30. More particularly, each interface may be indicated, one after another, for sufficient time to allow the user to indicate that the user wishes to select the option represented by the highlighted graphical user interface.

The graphical user interfaces may indicate software, television functions, Internet sites, or other capabilities enabled by the processor-based system 16. By time sequencing through the graphical user interfaces, as indicated in FIGS. 2 through 4, and providing sufficient time at each interface, the user is able, using the RCU 12, to select one of the functions represented by a graphical user interface 30, in one embodiment. For example, the user may operate the select button 26 while one of the graphical user interfaces 30 is highlighted to select that function.

This system provides a simple method, even for inexperienced users, to make selections in a processor-based system. The same system may also allow for more advanced selections, including those possible with a navigation keypad 24. For example, with the navigation keypad 24, the user can control the selective highlighting of each of the icons 30, and may select one of the icons by pressing the select button 26. Otherwise, the system automatically cycles, in a timed sequence, through the available icons until the user makes a selection or turns the system off.

Figure 5:
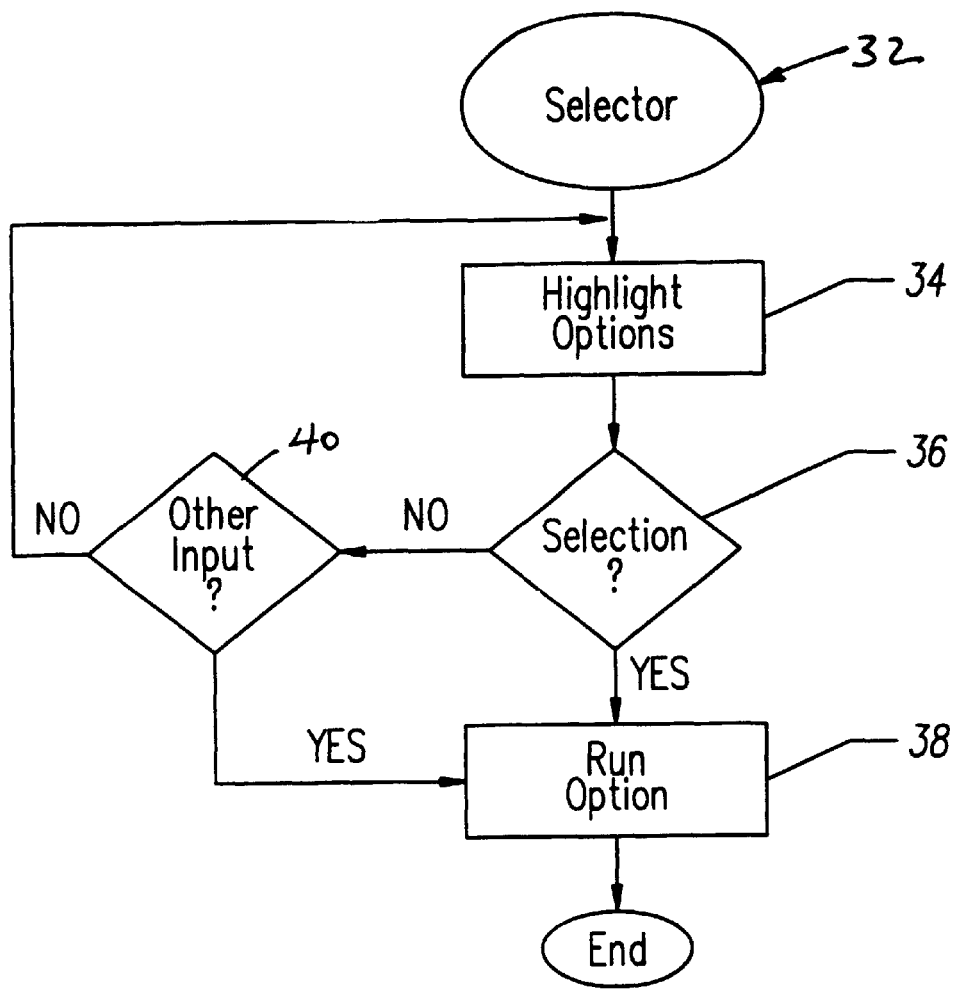
FIG. 5 is a flow chart for one embodiment of the present invention.

Referring now to FIG. 5, software 32 may implement one embodiment of the present invention. The software may begin by highlighting the available options, as indicated in block 34. The highlighting may involve a timed sequence of highlighting of a variety of graphical user interfaces 30, as previously described. In each case, each graphical user interface 30 is highlighted for sufficient time to allow the user to make a selection, for example, by operating a key associated with a remote control unit.

At diamond 36, a determination is made as to whether the user has selected one of the highlighted options. If so, the selected feature is run (block 38) and the selection program is terminated. If not, a check at diamond 40 determines whether any other input signal has been received. For example, the check may determine whether the operator has operated one of the navigation keypad 24 functions, indicating the user wishes to terminate the automatic timed sequencing through the available options. If so, the feature selected using the navigation key pad 24 is operated, as indicated in block 38, and the flow terminates.

Figure 6:
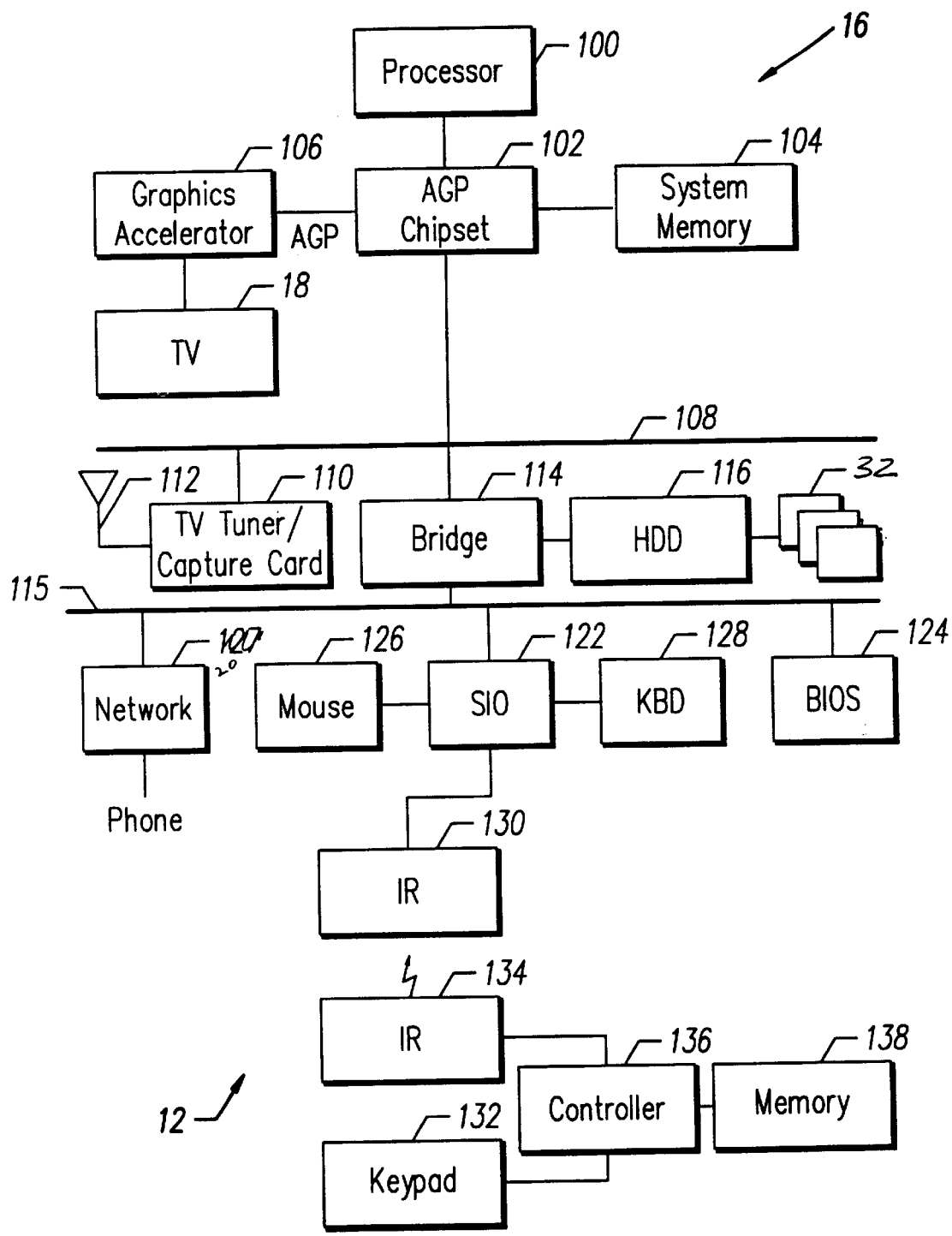
FIG. 6 is a block diagram showing the RCU and set-top computer system shown in FIG. 1.

Referring now to FIG. 6, an example of a processor-based system for providing the capabilities previously described may involve either a computer, television receiver, set-top computer, or another appliance. The illustrated system 16 includes a processor 100, coupled to an accelerated graphics port (AGP) chipset 102. AGP is described in detail in the *Accelerated Graphics for Interface Specifications, Revision 2.0*, published in May 1998 by Intel Corporation of Santa Clara, Calif. The AGP chipset 102 may, in turn, be coupled to system memory 104 and a graphics accelerator 106. The graphics accelerator 106 may be coupled to a television receiver 18.

The chipset 102 may also be coupled to a bus 108, which, in turn, may be coupled to a tuner/capture card 110. The TV tuner/capture card 110 may be coupled to a TV input source 112. The input source 112, may be for example, a conventional TV antenna, satellite antenna, cable connection or other television input sources. The card 110 may receive television signals in one video format and convert the signals into a format used by the system 16.

The bus 108 may also be coupled to another bridge 114, which, in turn, couples a hard-disk drive 116. The hard-disk drive 116 may store the software 32. The bridge 114 may be coupled to a bus 115, coupled to a serial input/output (SIO) device 122, a network 20, and a basic input/output system (BIOS) 124. The SIO device 122 may interface to a mouse 126 and a keyboard 128. The SIO device may also be coupled to the RCU 12, through the interface 130, to enable the system to receive input from a wireless remote control. The network 20 may be, for example, a connection to a telephone network or a local area network.

The RCU 12 may provide either infrared and radio frequency signals, which may be received by the interface 130. An infrared interface 130 may, for example, be in accordance with the Infrared Data Association protocol, e.g., a *Serial Infrared Physical Link Specification*, Version 1.2, dated Nov. 30, 1997. The RCU 12 may include a keypad 132 coupled to an infrared transmitter 134 that transmits an infrared signal to the interface 130. The infrared controller 136 may control the transmitter 134 and receive information from the keypad 132. The controller 136 may have an associated memory 138 which, in one illustrated embodiment, may be nonvolatile random access memory (NVRAM). The memory 138 stores the information provided by the system 16 to enable the RCU 12 to provide the appropriate signals to control the system 16.

The graphical user interfaces described herein are visual representations of the memory states. The graphical user interfaces displayed on the display 18 may be stored in a memory, such as one or more of the memories 104 and 116.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of controlling a processor-based system comprising:

displaying a plurality of selectable options;

automatically and consecutively indicating said selectable options in a timed sequence;

receiving an input signal when one of said options is indicated; and in response to said signal, causing said one option to be selected.

2. The method of claim 1, wherein automatically and consecutively indicating includes highlighting said selectable options one after another.

3. The method of claim 1, wherein receiving an input signal includes receiving an input signal from a remote control unit.

4. The method of claim 1, wherein receiving an input signal includes receiving an infrared remote control unit signal and converting said infrared remote control unit signal into an electrical signal.

5. The method of claim 1, wherein displaying a plurality of selectable options includes displaying a plurality of graphical user interfaces.

6. The method of claim 1, wherein causing said one option to be selected includes causing a software program associated with said option to be run.

7. The method of claim 1 further including selecting an option by a single actuation.

8. An article comprising a medium that stores instructions that cause a processor-based system to:

display a plurality of selectable options;

automatically and consecutively indicate said selectable options in a timed sequence;

receive an input signal when one of said options is indicated; and in response to said signal, cause said one option to be selected.

9. The article of claim 8, including instructions that cause a processor-based system to automatically and consecutively highlight said selectable options.

10. The article of claim 8, including instructions that cause a processor-based system to receive an input signal from a remote control unit.

11. The article of claim 8, including instructions that cause a processor-based system to receive an infrared remote control unit signal and convert said infrared remote control unit signal into an electrical signal.

12. The article of claim 8, including instructions that cause a processor-based system to display a plurality of graphical user interfaces.

13. The article of claim 8 further including instructions that cause a processor-based system to enable an option to be selected based on a single user actuation.

14. A processor-based system comprising:

a processor;

a memory coupled to said processor;

a device coupled to said processor and adapted to produce signals for automatically and consecutively indicating a plurality of user selectable options in a timed sequence; and an input device adapted to provide an input signal selecting one of said selectable options.

15. The system of claim 14, wherein said input device is a remote control unit.

16. The system of claim 14, wherein said options are represented by graphical user interfaces.

17. The system of claim 14, wherein said device is adapted to enable selection of one of a plurality of options by a single actuation.

18. The system of claim 14 including a television receiver coupled to said processor.

19. The system of claim 14 wherein said system is a set-top computer system.

20. The system of claim 14 wherein said device is adapted to register the selection of an option when an input signal is received while one of said options is indicated.

* * * * *